United States Patent Office 3,423,417
Patented Jan. 21, 1969

3,423,417
FLUOROALKYLAMIDOMETHYLPWRIDINIUM COMPOUNDS
William C. Sheehan, Birmingham, Ala., and George R. Thomas, Framingham, Mass., assignors, by mesne assignments, to the United States of America as represented by the Secretary of the Army
No Drawing. Filed Apr. 20, 1965, Ser. No. 449,620
U.S. Cl. 260—295          8 Claims
Int. Cl. D06m *13/00;* C07d *31/34*

ABSTRACT OF THE DISCLOSURE

Novel fluoroalkylamidomethylpyridinium compounds, prepared by reacting a fluoroalkylamide with pyridine, formaldehyde and an acid, which compounds impart hydrophobic and oleophobic properties to materials treated therewith.

---

This invention relates to a new class of fluorochemical compounds and to methods for preparing such compounds. This invention also relates to the use of such compounds to impart hydrophobic and oleophobic characteristics to various materials.

Means for treating materials, such as yarns, fabrics, films, papers, and leather, to make them permanently resistant to wetting by both water and oily fluids have been much sought for many years. Effects are desired which will be retained during normal use and after repeated wet laundering and dry cleaning. Treatments have been developed that produce water-repellent effects on many substrates which are reasonably fast to washing and to dry cleaning. The types of treating materials that have had most success commercially for producing water repellent effects on cellulosic subtrates react with the cellulose so that water repellent moieties are attached to the substrate by chemical bonds. One of these reactive types is reported to be an alkyloxymethylpyridinium salt. However, treatment of substrates with compounds of this type do not impart repellency to oily materials.

The most effective compounds which are known for imparting oleophobic properties to materials are fluorochemical compounds. Compounds of this general class which are commercially available, such as a perfluorosulfonamide of acrylic acid, impart initial oil and water repellency. However, these effects are not durable to laundering or dry cleaning.

Attempts have been made to produce durable water and oil resistant effects by treatments with combinations of water-repellent agents, such as a pyridinium compound, and fluorochemicals. For example, the U.S. Army Quartermaster Corps has developed a product (Quarpel) that is a combination of a long-chain alkyl pyridinium compound and a fluorochemical. This product imparts both water and oil repellency to textiles with reasonably good fastness to laundering and dry cleaning. However, this combination is subject to the disadvantage that the water repellent agent, such as a pyridinium compound, decreases the oil repellent effect of the fluorochemical.

The preparation of two perfluoroalkoxyhydroxypropyl ethers of cellulose has been reported. Although one of these preparations is alleged to have good oil and water repellent properties that are fast to washing and dry cleaning, it was reported that the other was water repellent but had only "some degree of resistance to oil."

There have also been prepared partial esters of cellulose by the reaction of cellulose immersed in dimethylformamide with perfluorobutyryl chloride or perfluorooctanoyl chloride in the presence of a tertiary aromatic amine. These products are reported to possess oil and water repellent properties which are durable to dry cleaning and aqueous laundering in the presence of neutral detergents. However, both esters were hydrolyzed in the presence of alkaline detergents.

It is an object of this invention to provide a novel class of fluorochemical.

It is another object of this invention to provide a process for preparing such compounds.

It is a further object of this invention to provide a material which has been treated with a novel fluorochemical compound to render it hydrophobic and oleophobic.

These and other objects are attained by the practice of this invention which, briefly, comprises providing a fluoroalkylamidomethylpyridinium compound having the general formula

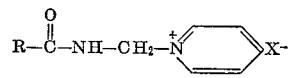

wherein R is a member selected from the group consisting of groups having the formulas $CF_3-(CF_2)_m-$ and $HCF_2-(CF_2)_n-$ in which $m$ has a value of at least 3 and $n$ has a value of at least 7, and X is a monovalent anion. Some examples of the group X in the above formula include halide groups, such as chloride, bromide and fluoride, and (lower) alkanoic acid groups (i.e., containing up to 6 carbon atoms) such as formate and acetate. It is preferred, when the R group is $$CF_3-(CF_2)_m-$$

that $m$ have a value of from about 4 to 8; and when the R group is $HCF_2-(CF_2)_n-$, that $n$ have a value of from about 8 to 12.

In order to prepare the novel compounds of this invention, a fluoroalkanoyl chloride is first prepared by the following reaction:

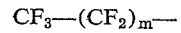

This reaction may be conducted in an inert solvent and may be hastened by heating at reflux. The fluoroalkanoyl chloride is then reacted with ammonia (or ammonium hydroxide) to prepare the corresponding fluoroalkylamide. The reaction will proceed without external heating. This reaction may be represented as follows:

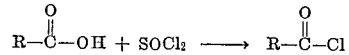

The fluoroalkylamide forms as a precipitate and may be recovered by conventional means such as by filtration or centrifugation. It is then reacted with pyridine, an acid and formaldehyde, or a compound capable of yielding formaldehyde such as paraformaldehyde. The reaction is preferably conducted in an inert solvent with heating and agitating. The reaction may be conducted in a stepwise manner by first reacting the formaldehyde with the fluoroalkylamide in the presence of an acidic catalyst, such as toluenesulfonic acid, reacting the product with pyridine and thereafter reacting with an acid. This reaction may be represented as follows:

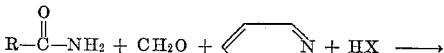

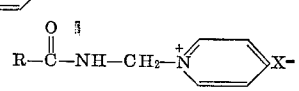

The novel compounds of this invention may be used to impart water and oil resistant characteristics to natural and synthetic fibers and filaments in such forms as fibers, yarns, fabrics (woven or nonwoven), and paper. They are also effective for treating leather. The general method of treatment is to apply a compound of this invention to the substrate from a solution or dispersion thereof, and then to dry, cure, neutralize, and redry the treated material.

The following examples illustrate the best modes contemplated for preparing the novel compounds of this invention:

Example 1

To a 3-neck, round-bottom flask fitted with a reflux condenser and stirrer were added 100 grams of perfluorooctanoic acid, 250 grams of thionyl chloride, and 1 gram of pyridine. The mixture was refluxed for 22 hours with stirring and then it was cooled to room temperature. The mixture was poured into a separatory funnel and the lower layer of perfluorocapryl chloride was separated. The yield of product was 78.5% of theory. The perfluorocapryl chloride was slowly added over a period of 2 hours with continuous stirring to 360 grams of concentrated ammonium hydroxide. The white precipitate that formed as the perfluorocapryl chloride was added to the ammonium hydroxide was collected at the end of the reaction period by centrifuging the mixture and decanting the ammonium hydroxide. The precipitate was washed with water three times and then dried in a vacuum oven. The yield of product, perfluorocaprylamide, was 75% of theory for this step. The product melted at 142–145° C. As indicated below, microanalysis of the product showed that it had the correct carbon and nitrogen content for perfluorocaprylamide:

Calculated for $C_8H_2F_{15}$ NO: C, 23.26%; N, 3.39%. Found: C, 23.9%; N, 3.55%.

To a 3-neck, round-bottom flask fitted with a reflux condenser and a thermometer were added 20.0 grams of perfluorocaprylamide, 3 grams of paraformaldehyde, and 0.1 gram of p-toluenesulfonic acid. Then, 100 grams of benzene and 300 ml. of xylene were added to flask, and the mixture was refluxed while being stirred by a magnetic stirrer. After the mixture had refluxed for 12 hours, 5 grams of pyridine and 5 ml. of 2-butanone were added and refluxing was continued for 2 hours more. Hydrogen chloride, purified by passage through sulfuric acid, was then bubbled through the refluxing solution for 2 hours. One hour after completion of addition of the hydrogen chloride gas, heating was terminated, and the excess hydrogen chloride was neutralized with additional pyridine. A yellow precipitate formed first as the mixture cooled; and, on further cooling, a white solid also precipitated. On reheating the mixture to about 70° C. with stirring, the white solid redissolved. The mixture was filtered hot, and the insoluble yellow material was collected on a fritted glass filter and washed three times with warm xylene. On cooling, a white solid precipitated from the filtrate. The precipitate was collected on a fritted glass filter. Both the yellow and the white materials were dried in a vacuum desiccator. The white material was recrystallized from warm acetone and dried in a vacuum oven. The infrared spectrum of the white product was identical with that of the starting material, perfluorocaprylamide. The infrared spectrum of the yellow waxy material (6.1 grams) corresponded to the spectrum expected for perfluorocaprylamidomethylpyridinium chloride. The sample was 85–90% pure, as indicated by potentiometric titrations with 0.1 N NaOH for the determination of hydrochloric acid and with 0.114 AgNO₃ for the determination of chloride. Carbon, hydrogen, and nitrogen analysis of the sample corrected to 100% purity agreed with calculated values for perfluorocaprylamidomethylpyridinium chloride

Example 2

Seventy-two grams of hexadecafluorononyl alcohol, which had been purified by recrystallization from hot chloroform, and 500 ml. of glacial acetic acid, were heated to 100° C. in a 2-liter, 3-neck, round-bottom flask fitted with two reflux condensers and a thermometer. The reaction mixture was stirred vigorously by means of a magnetic stirrer. Sixty grams of finely ground potassium permanganate were added over a period of 2 hours through one of the condensers. The temperature of the reaction mixture varied between 90 and 105° C. during the addition. After the addition of permanganate was completed, the reaction mixture was refluxed for 2 hours at 100° C. and cooled to room temperature. Sulfur dioxide gas was then added with vigorous stirring until all of the manganese dioxide had been reduced. Most of the acetic acid was then removed from the mixture by distillation at reduced pressure with a water aspirator. The crude manganese salt, after drying at 45–50° C. in a vacuum oven for 48 hours, was converted to the hexadecafluorononanoic acid by mixing it with 42% sulfuric acid and extracting the mixture with ethyl ether to remove the acid. Since acetic acid is infinitely soluble in ethyl ether, some of it was extracted along with the desired product. This was confirmed by the acetic acid odor of the product obtained after evaporation of the ether. The ether extractable material was further purified by recrystallizing it from 65 grams of xylene solution cooled to 5–10° C. in an ice bath. The white, crystalline material that precipitated from the xylene was collected and dried for 16 hours at room temperature in a vacuum oven. The dried material had a melting point of 50–52° C. and represented a 63% yield.

The amide was prepared by converting the hexadecafluorononanoic acid to the corresponding acid chloride with thionyl chloride and reacting the acid chloride with ammonium hydroxide, as described in Example 1. A total of 94 grams of hexadecafluorononanoic acid was converted to 33.7 grams (37% yield) of hexadecafluoronylamide having a melting point of 140–141° C. This product was reacted with paraformaldehyde, pyridine and hydrochloric acid as described in Example 1 to obtain 22.7 grams of hexadecafluoronylamidomethylpyridinium chloride

in the form of a yellow, waxy paste. The ionic chloride content of the product was 10.8%. Since the theoretical ionic chloride is 6.19%, contamination with some impurity with a higher ionic chloride content than the product was indicated. Treatment of the product with acetone lowered the ionic chloride content to 7.76%. Repetition of the acetone treatment caused no further decrease. The final product was a yellow wax having an elemental analysis of 32.3% C, 2.02% H, 6.06% N, and 7.76% Cl. The theoretical analysis of the product 31.5% C, 1.58% H, 4.89% N, and 6.19% Cl.

Example 3

Eicosafluoro-1-undecanoic acid was prepared from eicosafluoro-1-undecanyl alcohol in the same manner as the hexadecafluorononanoic acid was prepared from hexadecafluoronyl alcohol in Example 2. Sixty-eight grams of product (melting point 105–106° C.) was obtained from 81 grams of the alcohol. This corresponded to a yield of 83%. The eicosafluoro-1-undecanoic acid was converted to eicosafluoro-1-undecanamide in the same manner as perfluorooctanoic acid was converted to perfluorocaprylamide in Example 1. The yield was 42.9 grams (49%) of the amide (melting point 150–152° C.). The 42.9 grams of the amide of eicosafluoro-1-undecanoic acid were treated in the same was as the amide of perfluorooctanoic acid in Example 1 to obtain eicososafluoro-1-undecanylamidomethylpyridinium chloride

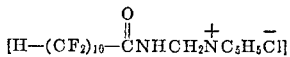

a yellow waxy product which weighed 19.6 grams.

Example 4

When the process of Example 1 is repeated substituting hydrogen bromide, acetic acid and formic acid, respectively, for the hydrogen chloride used in that example, there are obtained perfluorocaprylamidomethylpyridinium bromide, perfluorocaprylamidomethylpyridinium acetate, and perfluorocaprylamidomethylpyridinium formate, respectively.

Example 5

When the process of Example 1 is repeated substituting perfluorocaproamide and perfluorocapramide, respectively, for the perfluorocaprylamide used in that example, there are obtained perfluorocaproamidomethylpyridinium chloride and perfluorocapramidomethylpyridinium chloride, respectively.

For the purpose of comparison, two perfluoroalkylamidomethylpyridinium chlorides which are outside of the scope of this invention were prepared. The preparations of these two compounds are described in Examples 5 and 6.

Example 6

According to the process of Example 1, perfluoropropionic acid was reacted with thionyl chloride to produce perfluoropropionyl chloride, which was then reacted with ammonium hydroxide to prepare perfluoropropionamide. The perfluoropropionamide was reacted with paraformaldehyde, pyridine and hydrochloric acid, as described in Example 1, to obtain perfluoropropylamidomethylpyridinium chloride

in a yield of 26.3% of theory. The product analyzed as follows: Calculated for $C_9F_5H_8ON^+Cl^-$: C, 37.2%; H, 3.85%; N, 9.64%; Cl, 12.2%. Found: C, 38.1%; H, 3.11%; N, 11.3%; Cl, 10.6%.

The purity of this product, based on milliequivalents of titratable acid (3.441 meq. per gram), was determined to be 84.4%.

Example 7

According to the process of Example 1, perfluorobutyric acid was reacted with thionyl chloride to produce perfluorobutyryl chloride, which was then reacted with ammonium hydroxide to prepare perfluorobutyramide. The perfluorobutyramide was reacted with paraformaldehyde, pyridine and hydrochloric acid, as described in Example 1, to obtain perfluorobutylamidomethylpyridinium chloride

in a yield of 51.9% of theory. The product analyzed as follows: Calculated for $C_{10}F_7H_8ON^+Cl^-$: C, 35.3%; H, 2.37%; N, 8.23%; Cl, 10.4%. Found: C, 35.1%; H, 2.81%; N, 9.09%; Cl, 10.9%.

The purity of this product, based on milliequivalents of titratable acid per gram (3.405) and the percent ionic chloride content (10.9%), was determined to be 91.9% to 97.6%.

The compounds of this invention may be applied from either aqueous or organic solutions or dispersions to treat materials such as cloth, paper, leather, yarns, and the like. After the treated material is dried, cured, neutralized and redried, it is resistant to wetting by both oil and water and it will generally retain this property even after repeated launderings, dry cleanings and weathering.

The novel compounds of this invention undergo many reactions which are unique to this particular class of compounds. Thus, when heated in the presence of materials containing reactive hydrogen atoms, such as cellulosic fibers (Cell—OH),

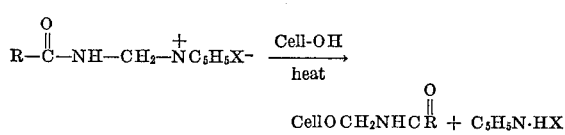

In the presence of water, which is present in most materials, the following reaction can also occur:

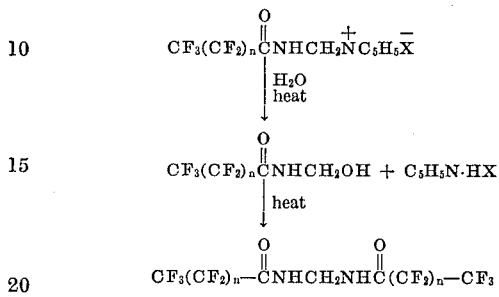

These unique reactions probably account for the durability of treatments with the compounds of this invention to repeated washings.

The following examples illustrate the use of compounds of this invention to treat various materials to impart hydrophobic and oleophobic characteristics to these materials:

Examples 8 to 10

Samples of desized and bleached cotton fabric (3.3 oz./yd.$^2$) were treated with fluoroalkylamidomethylpyridinium chlorides listed in Table I. In each example, the fabric was immersed in aqueous bath containing 8% by weight of the compound being tested and 1.6% by weight of anhydrous sodium acetate (5:1 weight ratio of the fluoro compound to sodium acetate) at 43 to 45° C., for 2 to 3 minutes. After removal from the bath, excess solution was removed from the fabric by padding. The padded samples were dried for 3 minutes at 80° C. and cured for 3 minutes at 100° C. After curing, the samples were neutralized by treatment in a bath containing 0.1% by weight of sodium carbonate and 0.25% by weight of Lux liquid detergent at 60° C. for 15 minutes. The neutralized samples were rinsed in water at 45–50° C. for 1 hour and finally cold water for 1 hour. The rinse water was changed once at both temperatures. The samples were then dried at 100° C. Each sample was then evaluated for oil and water repellency and the results are set forth in Table I. The water repellency of the samples was evaluated by ASTM Method D583–58 for determining spray ratings based upon a maximum water repellency of 100.

The oil repellency test was based on the difference in the penetrating or wetting properties of mineral oil and n-heptane. These two liquids are miscible in all proportions and exhibit greater wetting power as the amounts of n-heptane in the mixture is increased. The oil repellency rating assigned to each of the eleven test oils that are used are given in Table II. To measure the oil repellency of a treated fabric, drops of the test oil are placed gently on the fabric and allowed to stand undisturbed for 3 minutes. The number corresponding to the mixture containing the highest percentage of heptane which does not penetrate or wet the fabric is the oil repellency rating of the test material. Maximum oil repellency is rated 150. The oil repellency values determined by this method have been found to correlate with the actual resistance of materials to oil stains. Fabrics with an oil repellency rating of 50 to 70 have fair resistance to oil staining; fabrics with an oil repellency rating of 80 to 90 have good resistance to oil staining; and fabrics with oil repellency ratings of 100 or greater have excellent resistance to oil staining.

In Table I, the add-on percent by weight was determined by increase in weight of the sample after curing and neutralizing. The wet pickup percent by weight was determined by increase in weight of the sample before drying and curing.

TABLE I

| Example | Product of example | Wet pickup, percent by weight | Add-on percent by weight | Water repellency spray ratings | Oil repellency |
|---|---|---|---|---|---|
| 8 | 1 | ---------- | 2.0 | 70 | 130 |
|   |   | ---------- | 4.4 | 80 | 120 |
| 9 | 2 | 131 | 2.1 | 50 | 50 |
|   |   | 126 | 2.0 | 50 | 50 |
| 10 | 3 | 118 | 4.1 | 50 | 60 |
|   |   | 123 | 2.8 | 50 | 60 |
|   |   | 122 | 2.2 | 50 | 60 |

TABLE II

| Oil repellency rating | Percent mineral oil | Percent n-heptane |
|---|---|---|
| 150 | 0 | 100 |
| 140 | 10 | 90 |
| 130 | 20 | 80 |
| 120 | 30 | 70 |
| 110 | 40 | 60 |
| 100 | 50 | 50 |
| 90 | 60 | 40 |
| 80 | 70 | 30 |
| 70 | 80 | 20 |
| 60 | 90 | 10 |
| 50 | 100 | 0 |
|  | (Immediate penetration by mineral oil) | |

By way of contrast, the products of Examples 6 and 7 were tested by immersing samples of desized and bleached cotton fabric (3.3 oz./yd.$^2$) in an aqueous bath containing 6.6% of the compound being tested and 1.6% of anhydrous sodium acetate at 43 to 45° C. for 2 to 3 minutes. The samples were then removed from the bath, further treated and evaluated for oil and water repellency as described in Examples 8 to 10. The oil repellency and water repellency of both samples were 0. That is, cloth samples treated with the product of Examples 6 and 7 exhibited no resistance to either oil or water.

Example 11

A sample 3.3 oz./yd.$^2$, desized and bleached, cotton fabric was treated by padding with a 20% isopropanol solution of perfluorocaprylamidomethylpyridinium chloride (i.e., the product of Example 1) to apply 1.6% by weight of solids to the sample. The sample was dried for 3 minutes at 60° C. and cured for 3 minutes at 140° C. The cured sample was then washed in acetone for 1 hour, in water at 45–50° C. for 1 hour, and finally in cold running water for 1 hour. The sample was then dried at room temperature. The sample was evaluated for water and oil repellency by the methods described in Examples 8 to 10. The water repellency or spray rating was 80 and the oil repellency rating was 80.

Examples 12–22

The materials listed in Table III were treated with perfluorocaprylamidomethylpyridinium chloride and evaluated for water and oil repellency. All of the materials were treated by immersing a sample for several minutes in an 8% aqueous dispersion of the product of Example 1. They were then padded to remove excess liquid, dried, cured and neutralized. The cotton, Dacron-cotton blend, wool and nylon-wood pulp paper samples were immersed in the pad bath for 3 minutes; the leather and polypropylene for 5 minutes; the nylon and Dacron samples for 10 minutes; and the all-cellulose paper for 1 minute. The samples were evaluated for water and oil repellency by the methods described in Examples 8 to 10. The increases in weights of the samples due to the treatments and the oil and water repellency ratings for each are given in Table III. The percent solids add-on was determined as described in Examples 8 to 10.

TABLE III

| Example | Material | Add-on, percent solids | Oil repellency | Water repellency spray rating |
|---|---|---|---|---|
| 12 | Cellulose Acetate (11.2-oz./yd.$^2$) | 0.9 | 90 | 50 |
| 13 | Silk (2.3-oz./yd.$^2$) | 1.0 | 90 | 50 |
| 14 | Nylon (2.1-oz./yd.$^2$) | 0.1 | 120 | 50 |
| 15 | Dacron (2.5-oz./yd.$^2$) | 2.0 | 90+ | 50 |
| 16 | Wool (7.8-oz./yd.$^2$) | 9.8 | 80 | 70 |
| 17 | Desized Cotton (3.3-oz./yd.$^2$) | 3.6 | 130 | 80 |
| 18 | Dacron/cotton (4.3-oz./yd.$^2$) | 1.7 | 90 | 70 |
| 19 | Leather (19.7-oz./yd.$^2$) | 1.7 | 70 | 50 |
| 20 | Polypropylene (8.2-oz./yd.$^2$) | 0 | 0 | 0 |
| 21 | Cellulose paper (2.5-oz./yd.$^2$) | 5.4 | 120 | 80 |
| 22 | Nylon/wood pulp paper (50:50) (2.5-oz./yd.$^2$) | >1.0 | 100 | 70 |

Example 23

In order ot demonstrate the relationship between the percent of add-on of a fabric treated with the compounds of this invention and the oil repellency of the treated fabric, a series of samples of 3.3 oz./yd.$^2$ cotton fabric were treated with perfluorocaprylamidomethylpyridinium chloride as described in Examples 8 to 10 to give different percents of add-on. The oil repellency of the samples of different percents of add-on was determined as described in Examples 8 to 10 and the results are set forth in Table IV. Each value of oil repellency is the average for 3 to 5 samples. As can be seen from Table IV, oil repellency increased to a maximum of about 130 and then remained approximately constant with increasing add-on of the perfluorocaprylamidomethylpyridinium chloride. The lowest add-on at which maximum oil repellency was obtained was about 0.5%.

TABLE IV

| Add-on, percent by weight of solids | Oil repellency |
|---|---|
| 0 | 0 |
| 0.5 | 90 |
| 0.7 | 100 |
| 1.2 | 120 |
| 1.7 | 125 |
| 2.0 | 125 |
| 2.6 | 125 |
| 3.6 | 130 |
| 4.6 | 125 |
| 5.5 | 130 |

Example 24

This example illustrates the durability of the treatment of a fabric with a compound of this invention to laundering and compares this effect to treatment of a fabric with two known compositions—FC-208 (a perfluorosulfonamide of acrylic acid) and Quarpel (a combination of a long-chain alkyl pyridinum compound and a fluorochemical). Separate samples of a desized 3.3 oz./yd.² cotton fabric were treated to apply 4.8% by weight of perfluorocaprylamidomethylpyridinium chloride, 4% by weight of Quarpel and 5.0% by weight of FC-208. Separate samples of a scoured 2.5 oz./yd.². Dacron fabric was treated to apply 2.8% by weight of perfluorocaprylamidomethylpyridinium chloride and 3.7% by weight of FC-208. The Quarpel bath was prepared to contain 8% by weight of Zelan AP solids (an alkyloxymethylpyridinium salt) and 14.3% by weight of FC-208 solids on a product basis. The Zelan AP was diluted with water at 60° C. and mixed with an 0.8% of aqueous sodium acetate solution following the manufacturer's prescribed procedure, except that a portion of the water was withheld for dilution of the FC-208. The FC-208 was diluted with warm water (38° C.) and added to the solution of Zelan AP. Application to fabric samples was by padding with 100% wet pickup. The temperature of the bath was maintained at 45–50° C. during padding. Treated materials were dried at 120° C. for 5 minutes in a circulating air oven and then cured for 5 minutes in a circulating air oven at 175° C. The cured materials were neutralized for 15 minutes at 60° C. in a bath containing 0.1% by weight of sodium carbonate bath and 0.25% by weight of Lux liquid detergent. The neutralized materials were washed in water at 45–50° C. for 1 hour and for 1 hour in cold water, and then dried at 160° C. for 3 minutes. The samples treated with perfluorocaprylamidomethylpyridinium chloride were prepared as described in Examples 8 to 10. The samples of treated cotton and treated Dacron were evaluated for water and oil repellency as described in Examples 8 to 10 both before and after 5 launderings. The launderings were performed in a Maytag automatic washer, Model 132. Each washing cycle consisted of washing 14 minutes at 77° C. with 0.25 cup of Tide, extracting 2 minutes, wet spinning 0.5 minute, rinsing 2 minutes, and extracting 4.5 minutes. The samples were then dried in a Westinghouse clothes dryer (Model D-112), rinsed 10 times in distilled water at 49° C. and air dried. The results are set forth in Table V.

Example 25

This example illustrates the durability of the treatment of a fabric with a compound of this invention to accelerated weathering tests and compares this effect to treatment of a fabric with FC-208. Separate samples of desized 3.3 oz./yd.² cotton fabric were treated to apply 1.6% by weight solids of FC-208 and 1.8% by weight solids of perfluorocaprylamidomethylpyridinium chloride (product of Example 1). The samples were prepared as described in Examples 8 to 10 and were then exposed for 26 hours to accelerated weathering in a WeatherOmeter which was operated at a temperature of 52° C., the cycle being 162 minutes without spray and 18 minutes with an aqueous spray. The water and oil repellency of each sample were determined as described in Examples 8 to 10 both before and after the accelerated weathering. The results are set forth in Table VI. The exposure in the WeatherOmeter did not affect the spray rating of either sample, but the exposure decreased the oil repellency and stain resistance of the FC-208 treated sample. Neither the oil repellency nor the stain resistance of the sample treated with the product of Example 1 was affected by exposure for 26 hours in the WeatherOmeter.

TABLE VI

| Treatment | Exposure, hour | Water repellency, spray rating | Oil repellency |
|---|---|---|---|
| None | 0 | 0 | 0 |
| Do | 26 | 0 | 0 |
| 1.6% FC-208 | 0 | 70 | 110 |
| 1.6% FC-208 | 26 | 70 | 90 |
| 1.8% Product of Example 1 | 0 | 70 | 120 |
|  | 26 | 70 | 120+ |

Example 26

This example illustrates the durability of the treatment of a fabric with a compound of this invention to outdoor weathering and compares this effect to treatment of a fabric with FC-208. Separate samples of 3.3 oz./yd.² cotton fabric were treated to apply 4.5% by weight of FC-208 solids and 4% by weight of solids of the product of Example 1. The samples were prepared and the treated samples were evaluated for water and oil repellency both before and after outdoor weathering for 2 months as described in Examples 8 to 10. The results are set forth in Table VII. It will be seen that before outdoor weathering, the sample treated with the product of Example 1 had a lower spray rating than the sample treated with FC-208. The sample treated with the product of Example 1 had slightly better oil repellency than the sample treated with FC-208. After outdoor weathering, the sample treated with the product of Example 1 had oil and water repellent ratings which were better than those for the FC-208 treated sample. The outdoor weathering was accomplished by exposing the fabric through the months of September and October on an outdoor weathering board in Birmingham, Alabama.

TABLE V

| Fabric | Treatment | Add-on, percent solids | Water repellency, Spray rating | | Oil repellency | |
|---|---|---|---|---|---|---|
| | | | Before laundering | After 5 launderings | Before laundering | After 5 launderings |
| Cotton | FC-208 | 5.0 | 90 | 50 | 120 | 80+ |
| | Quarpel | 4.0 | 100 | 100 | 110 | 80 |
| | Product of Example 1 | 4.8 | 80 | 70 | 130 | 110 |
| Dacron | FC-208 | 3.7 | 100 | 50 | 90 | 80 |
| | Product of Example 1 | 2.8 | 50 | 50 | 90+ | 80+ |

TABLE VII

| Treatment | Add-on, percent solids | Water repellency, spray rating | | Oil repellency | |
|---|---|---|---|---|---|
| | | Before weathering | After weathering | Before weathering | After weathering |
| FC-208 | 4.5 | 90 | 0 | 110 | 110 |
| Product of Example 1 | 4.6 | 70 | 50 | 120 | 120 |

Example 27

This example illustrates the durability of the treatment of a fabric with a compound of this invention to dry cleaning. Samples of desized 3.3 oz./yd.² cotton fabric were treated to apply 3.6% by weight solids of the product of Example 1. The samples were prepared and the treated samples evaluated for water and oil repellency as described in Examples 8 to 10. Evaluations were made both before dry cleaning and after 5 dry cleanings. Dry cleaning was accomplished according to AATCC 85-1960T. The results are set forth in Table VIII.

TABLE VIII

| Water repellency, spray rating | | Oil repellency | |
|---|---|---|---|
| Before dry cleaning | After dry cleaning | Before dry cleaning | After dry cleaning |
| 80 | 50 | 130 | 80 |

Other similar fluoroalkylamidomethylpyridinium compounds may be prepared and used to treat materials to impart hydrophobic and oleophobic properties thereto, employing the procedures set forth in the preceding examples and in the more general descriptions set forth hereinabove.

We claim:

1. A compound selected from the group consisting of fluoroalkylamidomethylpyridinium compounds having the general formula

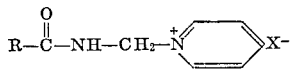

wherein R represents a group having the formula $$HCF_2—(CF_2)_n—$$

which $n$ has a value of at least 7, and X is a monovalent anion, said compounds being characterized by their ability to impart hydrophobic and oleophobic properties to various materials.

2. A compound as defined in claim 1 wherein $n$ is an integer of from 8 to 12.

3. Hexadecafluorononylamidomethylpyridinium chloride.

4. Eicosafluoro - 1 - undecanylamidomethylpyridinium chloride.

5. A process for preparing fluoroalkylamidomethylpyridinium compounds having the general formula

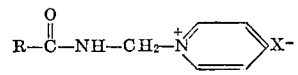

where R is a member selected from the group consisting of groups having the formulas $CF_3—(CF_2)_m—$ and $HCF_2—(CF_2)_n—$ in which $m$ has a value of 3 to 12 and $n$ has a value of 7 to 12, and X is a monovalent anion, which comprises reacting a fluoroalkylamide having the formula

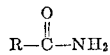

wherein R is the same as defined above, with pyridine, a member selected from the group consisting of formaldehyde and compounds capable of yielding formaldehyde, and an acidic compound having the formula HX, wherein X is the same as defined above, and thereafter recovering said fluoroalkylamidomethylpyridinium compound.

6. A process as defined in claim 5 wherein said fluoroalkylamide is perfluorocaprylamide and said acidic compound is hydrogen chloride.

7. A process as defined in claim 5 wherein said fluoroalkylamide is hexadecafluorononylamide and said acidic compound is hydrogen chloride.

8. A process as defined in claim 5 wherein said fluoroalkylamide is eicosafluoro-1-undecanamide and said acidic compound is hydrogen chloride.

References Cited

UNITED STATES PATENTS 2,764,602  9/1956  Ahlbrecht _____ 260—295 XR

HENRY R. JILES, *Primary Examiner.*

A. L. ROTMAN, *Assistant Examiner.*

U.S. Cl. X.R.

8—94.21, 94.33, 116.2, 127.6; 117—139.5, 142